Dec. 10, 1963 J. F. CONNOR 3,113,604
TIRE AND WHEEL CONSTRUCTION
Filed July 16, 1962
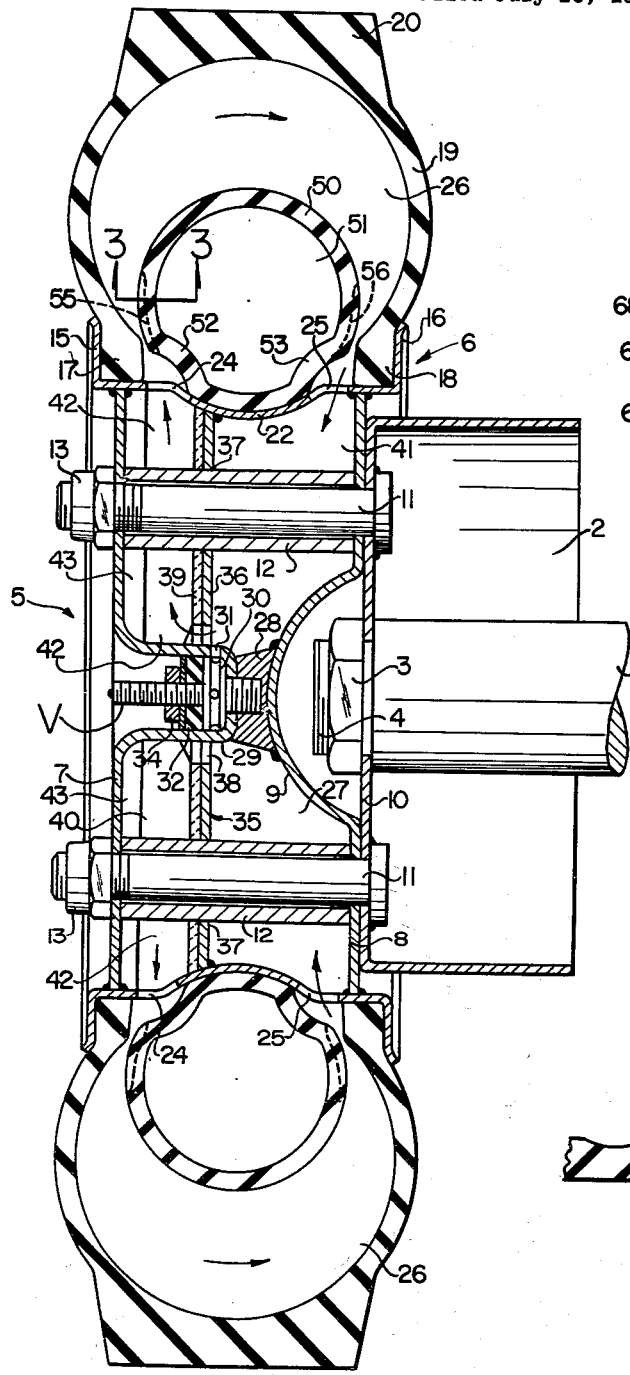
FIG 1
FIG 2
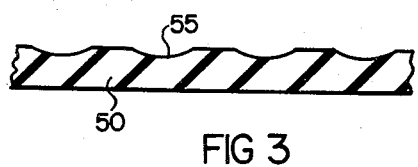
FIG 3
INVENTOR.
JAMES F. CONNOR
BY
Oberlin, Maky & Donnelly
ATTORNEYS

United States Patent Office 3,113,604
Patented Dec. 10, 1963

3,113,604
TIRE AND WHEEL CONSTRUCTION
James F. Connor, 3453 W. 128th St., Cleveland, Ohio
Filed July 16, 1962, Ser. No. 209,914
10 Claims. (Cl. 152—153)

This invention relates generally as indicated to a tire and wheel construction and more particularly to a pneumatic tire and wheel construction for safe high speed automotive travel.

One of the most common problems encountered in modern superhighway or turnpike travel is automotive fires occasioned by overheated tires. With some tires today being made of but a two ply construction, the problem of excessive heat being generated when such tires are run continually at high speeds is apparent. Excessive heat, of course, increases the pressure in the tire and further enhances the possibility of blow-outs which at modern turnpike speeds can be exceptionally dangerous.

It is accordingly a principal object of the present invention to provide an automotive tire and wheel construction which will not only reduce the tendency of automotive tires to overheat, but also will provide a safety feature precluding the inherent danger in high speed blowouts.

A further principal object is the provision in an automotive tire and wheel construction of a circulatory cooling system employing a portion of the wheel as a heat exchanger and using the rotation of the wheel to enhance the circulation of the air through the tire and wheel construction.

Still another principal object is the provision in such tire and wheel construction of an inner safety tire which can be employed to direct the cooling air transversely about the periphery of the tire.

Yet another object is the provision of a more safe tire and wheel construction for modern high speed automotive travel which employs conventional automotive drop-center wheel rims and tires.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is a vertical section of a tire and wheel construction in accordance with the present invention;

FIG. 2 is a fragmentary vertical section of a further form of the present invention; and FIG. 3 is a circumferential section of a portion of the inner safety tire of FIG. 1 taken substantially from the line 3—3 in FIG. 1.

Referring now to the drawing and more particularly to FIG. 1, there is illustrated a conventional wheel axle 1 having a brake drum 2 mounted thereon by the nut 3 threaded on stud 4.

Mounted on the brake drum 2 is a wheel 5 which includes a generally conventional drop-center wheel rim 6. A pair of annular plates 7 and 8 may be welded internally adjacent the edges of the drop-center wheel rim with the inner plate 8 having a hemispherical portion 9 clearing the stud 4 and nut 3 on the end of axle 1. The inner plate 8 lies flush against the end plate 10 of the brake drum when the wheel is assembled with the drum. Such assembly is accomplished by a plurality of peripherally spaced studs 11 which are suitably secured to the brake drum 2 and which pass through apertures in the plate 8 and through spacing collars 12 extending between the plates 7 and 8. Aligned apertures in the plate 7 accommodate such studs and the nuts 13 may be employed to hold the wheel firmly on the brake drum.

The drop-center wheel rim 6 includes the usual upstanding annular side flanges 15 and 16 which enclose the beads 17 and 18 of the tire 19. The tire 19 which may be of any conventional tubeless variety is provided with the tread 20 at the periphery thereof.

On both sides of the drop-center portion 22 of the drop-center wheel rim 6, there is provided a series of radially aligned and circumferentially spaced apertures 24 and 25. These apertures provide free fluid communication between the toroidal chamber 26 of the tire 19 and the chamber 27 in the wheel 5 defined by the drop-center rim 6 and the outer and inner plates 7 and 8. Accordingly, the volume of air required to inflate the tire 19 at the desired pressure is considerably greater than in conventional tires. Not only must the chamber 26 be inflated to the desired pressure but now also the chamber 27. This may be accomplished through a suitable inlet valve V threaded in boss 28 secured to the hemispherical portion 9 of plate 8. Such valve is thus seated through a hole in the bottom of a central recessed portion 29 of the plate 7 and serves as a central rigid support for such plate to preclude the same from bowing outwardly when the tire and wheel are under pressure. The valve V has an annularly grooved flange 30 providing air communication from the valve to the tire and wheel through aperture 31. A gasket 32 and a nut and washer assembly 34 may be provided threaded on the valve V as an air seal for the flange 30 and wall of the recess 29. In construction of the wheel, care will, of course, be taken to ensure that the spacing collars 12 for the plates 7 and 8 are sealed to such plates adjacent the apertures for the studs 11.

There is also provided in the chamber 27 a baffle plate structure 35 which may include an annular steel or like material plate 36 welded or otherwise secured to the drop-center portion 22 of the wheel rim adjacent the circumferentially spaced series of apertures 24. The baffle plate structure 35 is then disposed off center from the centerline of the wheel more closely to the plate 7 than to the inner plate 8. Plate 36 is, of course, provided with apertures 37 accommodating the collars 12 and a central somewhat larger aperture 38 in the center of the wheel. Suitably secured to the outer face of the plate 36 is a layer of heat insulating material 39 such as asbestos or foamed polyurethane having apertures therein corresponding to and aligned with the apertures in the plate 36. The layer of insulating material may be laminated to the plate 36 by a suitable heat resistant glue, for example. In this manner, it can be seen that the chamber 27 is then divided by the baffle plate assembly 35 into two separate chambers, i.e. relatively narrow outer chamber 40 in direct fluid communication with the series of apertures 24 and somewhat wider chamber 41 in direct communication with the series of apertures 25.

The plate 7 is preferably made of aluminum or other material having a high thermal conductivity. Also, the interior of such plate is provided with a series of radially extending cooling vanes or fins 42 which extend transversely from such plate 7 to the baffle 35 and radially from portion 29 of plate 7 to the wheel rim which serve not only to facilitate the cooling of the air within chamber 40, but also to trap such air within the chamber and force it radially outwardly as it cools. A series of more narrow radial vanes 43 may be positioned between the vanes 42 further to enhance air flow.

An inner safety tire 50 may be provided seated within the center of the drop-center portion 22 provided with a toroidal chamber 51 inflated to the desired degree and sealed from the chambers 26 and 27. However, the chambers 26 and 51 may be connected by a special valve (not shown) which will close sealing of the chamber 51 only when the pressure in chamber 26 falls below a predetermined amount. Such safety tire is provided with grooved portions 52 and 53 which preclude the closing of the apertures 24 and 25 by such safety tire. Since during tire flexures at high speed operations, it is possible for the safety tire 50 to contact the inner wall of the beads of the tire 19, there is provided a series of radially extending grooves 55 and 56 at such points of normal contact. These grooves are shown in greater detail in FIG. 3. Accordingly, even if the tire 50 contacts the inner wall of the bead of the tire 19, there will still be provided free fluid flow between the outer wall of the tire 50 and the inner wall of the tire 19.

In operation, the tire will initially be inflated through the valve V placing the chambers 26 and 27 at the desired pressure. Prior to operation, the temperature of the air in the chambers will be at ambient or substantially ambient temperature. As the tire continues in use, the air in chamber 26 will eventually heat up and being less dense than the air in chamber 27, such air will tend to flow radially inwardly through the apertures 25 into chamber 27 and thereby forcing such air from the chamber 41 into the chamber 40 through the aperture 38. This flow will also be induced by the cooler air in chamber 40 being displaced radially outwardly by the vanes 42 and such cooler air being more dense or heavy than the hotter air in chamber 26, such air will tend naturally to flow radially outwardly due to the inherent centrifugal force applied thereto. In any event, circulation of the air will be obtained due to the cooling vanes 42 and 43 and such centrifugal force being exerted on the more dense cooler air. The air will thus flow as indicated by the arrows radially outwardly of the chamber 40 through the apertures 24, between the walls of the tires 50 and 19 and into the chamber 26. The tire 50 will serve as a guide forcing the air against the peripheral portion of the tire adjacent the tread stock which naturally will require the most cooling. The cooler air entering the chamber 26 through the apertures 24 will displace the warmer air radially inwardly through the apertures 25 into the chamber 41 in the wheel and the hemispherical portion 9 of the wall 8 will serve also to help deflect the air through the central aperture 38 into the heat exchanging chamber 40 to be cooled by contact with the fins 42 of the plate 7 exposed to atmosphere. The layer of heat insulation material 39 will then serve to separate the warmer air in chamber 41 from the cooler air in chamber 40 further enhancing the circulation obtained.

Accordingly, a safer tire is provided in that a greater volume of air is employed requiring more heat to raise the temperature of such air to the danger point. Further, the air is circulated through the heat exchanging chamber 40 to maintain the same at a cool temperature with the air flowing radially outwardly through the apertures 24 and then circumferentially transversely around the torus formed by the tire 19 again to enter the chamber 27 through the apertures 25. The grooves 55 and 56 permit free flow of air in the path indicated at all times. The chambered wheel with which the conventional tire is employed can then easily be assembled and disassembled on the brake drum 2 in the regular manner by removing the nuts 13 from the studs 11.

In FIG. 2 there is illustrated a slightly modified form of the present invention in which the safety inner tire is replaced by an arched projecting center portion 60 of the rim 61. Should a blow-out occur, the tire is then precluded from becoming completely flat permitting the operator to maintain control of the vehicle. The rim 61 is provided with the upstanding annular edge flanges 62 and 63 enclosing the beads 64 and 65 of the tire 66. The bead 64 may be provided with a removable bead ring 67 held in slot 68 to facilitate the placement of the tire on the rim over the upstanding annular arch 60. The wheel rim including the arch may be formed by welding the two half sections together along the radially central seam 69. The annular straight walls 70 and 71 of the arch 69 terminate inwardly in shoulders 72 and 73 respectively which are provided with a series of radially aligned circumferentially spaced apertures 74 and 75. The apertures 74 may be formed by punching the tabs 76 downwardly to provide a means to join a radially extending wall 77 having heat insulating material 78 secured thereto. A central opening will be provided in such baffle wall so that the air in chamber 80 adjacent the wall 81 of the wheel, which corresponds to the wall 7 in the FIG. 1 embodiment, will be cooled to flow radially outwardly through the openings 74, and around the torus of the tire over the arch 60 and inwardly through the opening 75 into the chamber 82 closed interiorly by the wall 83 corresponding to the wall 8 in the FIG. 1 embodiment.

It can now be seen that there is provided a tire and wheel assembly wherein the wheel includes an air chamber in free fluid communication with the air in the tire with circulation currents being setup between the tire and wheel to provide a cooling air flow radially outwardly and around the torus of the tire and thence radially inwardly through the heat exchanging chamber in the wheel.

Other modes of applying the principle of the invention may be employed, change being made as regards the details described, provided the features stated in any of the following claims or the equivalent of such be employed.

I, therefore, particularly point out and distinctly claim as my invention:

1. In combination, a wheel, an air chamber in said wheel, a pneumatic tire mounted on said wheel, two circumferentially arranged sets of air passages, one on each side of said wheel, each set including a plurality of circumferentially spaced air passages freely connecting said tire and air chamber, and means in said air chamber operative to induce continuous air flow from said air chamber through one set of air passages to said tire and through the other set of air passages to said air chamber when said wheel and tire are rotated and the air in such tire is heated.

2. The combination set forth in claim 1 including baffle means including insulating means in said air chamber separating said sets of air passages, and heat exchanger means in said air chamber on one side of said baffle means including insulating means operative thus to induce such continuous fluid flow, said heat exchanger means being rigidly secured to one side of said wheel.

3. A pneumatic tire and wheel construction comprising a wheel having spaced wheel plates surrounded by a drop-center wheel rim forming a wheel air chamber, two axially spaced annular sets of air passages in said wheel rim, said air passages of each set being circumferentially spaced about said rim radially inwardly extending baffle means in said wheel separating said sets of air passages, a pneumatic tire mounted on said drop-center wheel rim, and heat exchanger means in said wheel operative to induce air flow from said tire to said wheel through one set of air passages about said baffle and back to said tire through the other set of air passages after having been cooled.

4. A tire and wheel construction as set forth in claim 3 including means operative to secure said plates together at the center thereof.

5. A tire and wheel construction as set forth in claim 4 wherein said last mentioned means comprises an inlet valve inserted through one plate and threaded in the other.

6. A tire and wheel construction as set forth in claim 6 wherein said baffle means comprises an annular plate having a layer of insulation material thereon.

7. A tire and wheel construction as set forth in claim 3 including a plurality of fixed vanes extending radially between said baffle and one of said wheel plates.

8. A tire and wheel construction as set forth in claim 3 including an inner annular member in said pneumatic tire operative to direct air flow transversely about the inner periphery of said tire from one set of air passages to the other.

9. In combination, a wheel, an air chamber in said wheel, a pneumatic tire mounted on said wheel, two sets of air passages, one on each side of said wheel, each set including a plurality of circumferentially spaced air passages freely connecting said tire and air chamber, means in said air chamber operative to induce continuous air flow from said air chamber through one set of air passages to said air chamber when said wheel and tire are rotated and the air in such tire is heated, baffle means in said air chamber separating said sets of air passages, heat exchanger means in said air chamber on one side of said baffle means operative thus to induce such continuous fluid flow, an inner safety tire mounted in said pneumatic tire, radially extending grooves in said inner safety tire adapted to facilitate such air flow through said one set of air passages and around the periphery of said safety tire peripherally transversely interiorly of said pneumatic tire and then through said other set of air passages.

10. In combination, a wheel, an air chamber in said wheel, a pneumatic tire mounted on said wheel, two sets of air passages, one on each side of said wheel, each set including a plurality of circumferentially spaced air passages freely connecting said tire and air chamber, means in said air chamber operative to induce continuous air flow from said air chamber through one set of air passages to said tire and through the other set of air passages to said air chamber when said wheel and tire are rotated and the air in such tire is heated, baffle means in said air chamber separating said sets of air passages, heat exchanger means in said air chamber on one side of said baffle means operative thus to induce such continuous fluid flow, said wheel including an annular central arch separating said sets of passages, said central arch guiding air flow from said chamber through said one set of air passages to said pneumatic tire and back to said chamber through said other set of air passages about the transverse periphery of said tire.

References Cited in the file of this patent

UNITED STATES PATENTS

| | | |
|---|---|---|
| 2,014,129 | Eger | Sept. 10, 1935 |
| 2,224,066 | Shore | Dec. 3, 1940 |
| 2,844,180 | Omeron | July 22, 1958 |
| 2,856,978 | Mullins | Oct. 21, 1958 |

FOREIGN PATENTS

| | | |
|---|---|---|
| 405,927 | Great Britain | Feb. 15, 1934 |
| 693,211 | Germany | July 4, 1940 |